Patented Jan. 5, 1954

2,665,312

UNITED STATES PATENT OFFICE 2,665,312

STABILIZED POLYGLYCOL COMPOSITIONS

Edward O. Ohlmann, Bay City, and William S. Thurber, Midland, Mich., assignors to The Dow Chemical Company, Midland, Mich., a corporation of Delaware No Drawing. Application August 3, 1951, Serial No. 240,274

18 Claims. (Cl. 260—611.5)

This invention relates to stabilizing certain polyglycol compounds against decomposition.

Polyglycol compounds in general are known to have good lubricating and solvent properties, high viscosity indices and flash points, low pour points and rubber-swelling characteristics, good heat-transfer characteristics, and thermal stability. In addition, these compounds have a negligible corrosive effect on metals. Such properties of the polyglycol compounds make them extremely useful in a wide variety of applications, such as hydraulic fluids, mold lubricants for rubber, engine lubricants, heat transfer liquids, and the like.

Many of these polyglycol compounds are, however, subject to the disadvantage that they tend to decompose on heating or on prolonged exposure to air. For some purposes this behavior is not serious, in that the decomposition products are either volatile or are soluble in the polyglycol compound and hence form no gummy deposit or sludge. For other purposes, however, the loss of bulk and change of viscosity accompanying decomposition cannot be tolerated.

It is therefore an object of this invention to stabilize certain polyglycol compounds against decomposition which occurs slowly on prolonged storage and more rapidly at elevated temperatures.

This invention is based on the discovery that resinous condensates prepared by reacting phenols with aromatic diolefins are highly effective in stabilizing polyglycol compounds against decomposition.

The polyglycol compounds which are stabilized according to the invention are polyglycols, polyoxyalkylene ethers of aliphatic alcohols, and the aliphatic acid esters of those of these compounds having free hydroxyl groups. The polyglycols, as is known, are diols corresponding to the general formula $H(OC_nH_{2n})_mOH$ in which $n$ is a small integer, e. g. 2 or 3 and $m$ is an integer from 2 to 100 or more. They are usually prepared by the autocondensation of an alkylene oxide, e. g. ethylene oxide or propylene oxide, or a mixture of such oxides, in the presence of alkali. The polyoxyalkylene ethers are ordinarily prepared by condensing one or more alkylene oxides, usually of from 2 to 3 carbon atoms per molecule, with an aliphatic alcohol, e. g. methanol, ethanol, n-butanol, i-octanol, glycerol, pentaerythritol, etc. Typical ethers are the glyceryl poly(oxyethylene, oxy-1,2-propylene) ethers prepared by condensing approximately equimolar mixtures of ethylene oxide and propylene oxide with glycerol, as described in a copending application Serial No. 192,603, filed October 27, 1950 by Lee H. Horsley et al. The condensates may, if desired, be further and even completely etherified by reaction with an aliphatic alkylating agent, e. g. a dialkyl sulfate. The polyglycols and polyalkylene ethers of aliphatic alcohols having one or more free hydroxyl groups may be converted to the corresponding esters by reaction with an aliphatic acylating agent, e. g. acetic anhydride, lauroyl chloride, etc. The molecular weights of these products are usually at least 300, and more often 500 or higher, depending on the properties desired. All the polyglycol compounds just characterized are capable of being stabilized according to the invention.

The resinous condensates employed as stabilizers in the invention are, in general, known substances and are prepared by the condensation of an aromatic diolefin, e. g. divinylbenzene, with a phenol (see, for instance, U. S. Patent 2,224,837). Preparation is conveniently carried out by adding the aromatic diolefin to the phenolic reactant in the presence of a condensation catalyst, usually a mineral acid. The mole ratio of diolefin to phenol is preferably in the range of 0.5:1 to 2:1, conveniently about 1:1. Condensation is ordinarily carried out at an elevated temperature, e. g. from 100° to the boiling point of the phenol, with the diolefin being added slowly over a period of several hours. However, with catalysts such as boron trifluoride, room temperature condensation is possible. The crude reaction product is washed to remove inorganic matter and may be further treated, as by vacuum distillation, to remove unreacted starting materials and low-boiling constituents, leaving a semi-solid or resinous condensate, which is the desired stabilizer.

The aromatic diolefins used in making the stabilizers are ordinarily di-alpha-alkenyl aromatic hydrocarbons in which each alkenyl group is attached to the aromatic nucleus, and preferably contains less than four carbon atoms, e. g. divinylbenzene and divinyltoluene. These diolefins may be employed in the pure state or admixed with related aromatic monoolefins, e. g. alkyl alpha-alkenyl aromatic hydrocarbons in which the alkyl and alkenyl groups preferably contain not more than four carbon atoms, for instance ethylvinylbenzene. Excellent results are realized, for example, when the aromatic diolefin material is a mixture of approximately 65 per cent by weight of divinylbenzene and 35 per cent by weight of ethylvinylbenzene made commercially by the pyrolysis of diethylbenzene (U. S. Patent 2,385,696).

The phenols used in making the stabilizer are all nuclearly hydroxylated aromatic hydrocarbons, preferably mono-, di-, or trihydric phenols. For best results, the phenol should contain from 6 to 25 carbon atoms, of which no more than 18 are nuclear nor more than 10 in fused rings. Monocyclic phenols are preferred, especially those with no more than 12 carbon atoms. If alkyl substituent groups are present, the phenol preferably has no more than two nuclearly substituted alkyl radicals containing a total of not more than 8 carbon atoms. If aralkyl groups are attached to the phenol nucleus, the latter is preferably monocyclic and the number of aralkyl groups not more than two, each group containing no more than 10 carbon atoms. Typical phenols which may be used are phenol, cresols, resorcinol, pyrogallol, phenyl-phenols, para-tertiary-butylphenol, benzylphenol, alpha-methyl - benzylphenol, p,p′ - isopropylidenediphenol, 2,4-bis(alpha-methyl-benzyl)phenol, and beta-naphthol.

The prepartion of these stabilizers is further illustrated in the following example which gives the method used to prepare a resinous condensation product of phenol with a mixture of divinylbenzene and ethylvinylbenzene.

EXAMPLE 1

A charge of 376 grams of phenol and 14 grams of concentrated hydrochloric acid as catalyst was placed in a two-liter, three-necked flask fitted with dropping funnel, stirrer, and reflux condenser. The mixture was heated to 120° C. with stirring and a 390 gram charge of a mixture of about 65 weight per cent divinylbenzene and about 35 weight per cent ethylvinylbenzene was added dropwise over a period of two hours. Stirring was continued for an additional two hours to insure complete reaction. The reaction mixture was then stripped of unreacted phenol and low-boiling products on an 18″ Vigreaux flash still at 1.5-2 mm. of mercury absolute pressure. The stripping operation was continued until the temperature of the still pot reached 290° C. at 2 mm. pressure. From a still charge of 768 grams of reaction product, there was obtained 254 grams of distillate consisting of unreacted phenol and low-boiling products and 498 grams of resin as residue. The latter was used as a stabilizer for polyglycol compounds according to the invention.

In preparing the stabilized polyglycol compounds of the invention, it is necessary only to incorporate a small but effective proportion of the diolefin-phenol resin in the polyglycol, polyglycol ether, or ester thereof to be protected. Most of the resins are readily soluble and may be dispersed in the polyglycol compound by stirring at ordinary temperature. With a few, such as the condensate of a mixture of divinylbenzene and ethylvinylbenzene with pyrogallol, the polyglycol compound should be warmed somewhat to speed up the dissolution. The proportion of stabilizing resin to be maintained in the polyglycol is ordinarily small, with from 0.1 to 5 per cent by weight usually being satisfactory, and 0.5 to 2 per cent preferred.

The resin-containing polyglycol compounds according to the invention exhibit exceptional stability during storage and prolonged exposure to air, even at elevated temperatures above 200° F. Marked stabilization at temperatures as high as 400° F. has been observed. The stabilizers not only retard loss in weight due to decomposition but also minimize change in viscosity. In ordinary service, e. g. as components of hydraulic fluids, these stabilized compositions will remain virtually unchanged for long periods of time.

In the following examples, which further illustrate the invention, the stabilized compositions were tested by a procedure which is a modified version of that specified by the Society of Automotive Engineers for hydraulic brake fluids. Briefly, a 10 gram sample of liquid to be tested was placed in a 3.5 inch glass petri dish and heated at 210° F. exposed to air for 2 days after which the sample was reweighed to determine change in weight. The sample was then heated for an additional 4 days at the same temperature and any further change in weight again observed. The viscosity of the liquid in centistokes was usually measured at 32° F. at the beginning of the test and at the time of each reweighing. In each case parallel blank tests were also run on the polyglycol compound without any stabilizer.

EXAMPLE 2

The polyglycol compound to be stabilized was a glyceryl poly(oxyethylene, oxy-1,2-propylene)ether prepared by condensing an equimolar mixture of ethylene oxide and propylene oxide with glycerol in the presence of an alkali hydroxide catalyst until approximately 38 mols of oxide had reacted per mol of glycerol. The condensate, after stripping under vacuum to remove any low-boiling components, had a viscosity at 100° F. of 135 centistokes.

The stabilizer resins were prepared by condensing a mixture of about 65 weight per cent divinylbenzene and about 35 weight per cent ethylvinylbenzene with an equimolecular proportion of each of several phenols. The condensations were carried out as in Example 1. The phenols used were: (1) a commercial mixture of meta and para cresols, (2) p-cresol, and (3) pyrogallol.

Test samples for stability determination were made up by mixing portions of the polyglycol compound with 0.5 per cent by weight of each of the stabilizers. Stability tests were carried out as described above. The results are shown in the accompanying table.

EXAMPLE 3

The polyglycol compound, glyceryl poly(oxyethylene, oxy-1,2-propylene)ether, was prepared from glycerol and a mixture of ethylene oxide and propylene oxide as in Example 2, except that approximately 67 mols of oxide were condensed per mol of glycerol, so that the viscosity of the product at 100° F. was 200 centistokes.

The stabilizers were prepared by condensing a mixture of about 85 weight per cent divinylbenzene and about 15 weight per cent ethylvinylbenzene with equimolar quantities of (1) p-cresol and (2) o-phenylphenol, as in Example 1. Stabilized compositions were then made up and tested as in Example 2. The results are shown in the table.

EXAMPLE 4

The polyglycol compound of Example 3 was stabilized with a number of resins made by the condensation of various phenols with equimolar proportions of a mixture of about 65 weight per cent divinylbenzene and about 35 weight per cent ethylvinylbenzene. The phenols used were: (1)

phenol, (2) mixed cresols, (3) pyrogallol, (4) 2,4-bis(alpha-methyl-benzyl)phenol, (5) beta-naphthol, (6) resorcinol, (7) p-tertiary butyl-phenol, (8) p-phenylphenol, and (9) p,p'-isopropylidenediphenol. Stability tests were carried out as in the preceding examples. The results appear in the table.

EXAMPLE 5

The polyglycol compound used was a polypropylene glycol having an average molecular weight of 750. Stabilizers were added and the tests carried out as in the previous examples, except that viscosity measurements were made at 77.5° F. The results are given in the table.

EXAMPLE 6

The polyglycol compound stabilized was a polypropylene glycol having an average molecular weight of 2000. Stabilizers were added, and tests carried out as in Examples 2 and 4. The table lists results.

EXAMPLE 7

The polyglycol compound tested was a polyethylene glycol having an average molecular weight of 600. Stabilizers were added and tests carried out as in the preceding examples, with viscosity measurements at 77.5° F.

In the table, the weight change shown is a loss except when preceded by a plus sign which indicates gain in weight. From the tabulated results, the exceptional stabilizing effect of the diolefin-phenol resins of the invention is clearly evident.

the aliphatic acid esters of those of these compounds having free hydroxyl groups stabilized against decomposition by a small proportion of a condensation product of a nuclearly hydroxylated aromatic hydrocarbon with a di-alpha-alkenyl aromatic hydrocarbon wherein each alkenyl group is attached to the aromatic nucleus.

2. A composition of matter as stated in claim 1 wherein the stabilizer is a resinous condensation product of a nuclearly hydroxylated aromatic hydrocarbon with a mixture of a mono alpha-alkenyl aromatic hydrocarbon and a di-alpha-alkenyl aromatic hydrocarbon wherein each alkenyl group is attached to the aromatic nucleus.

3. A composition of matter as stated in claim 1 wherein the nuclearly hydroxylated aromatic hydrocarbon has from 6 to 25 carbon atoms, of which no more than 18 are nuclear nor more than 10 in fused rings, and has no more than two alkyl radicals containing a maximum of 8 carbon atoms, and from one to three nuclear hydroxy substituents.

4. A composition of matter as stated in claim 3 wherein the nuclearly hydroxylated hydrocarbon is monocyclic.

5. A composition of matter as stated in claim 4 wherein the nuclearly hydroxylated hydrocarbon has from one to two alkyl groups attached thereto.

6. A composition of matter as stated in claim 3 wherein the nuclearly hydroxylated aromatic hydrocarbon has from 6 to 12 nuclear carbon atoms.

*Stability of polyglycol compounds at 210° F.*

| Example | Compounds | DVB Wt. percent | EVB Wt. percent | Phenol | Wt. percent | Wt. Change percent 2 days | Wt. Change percent 6 days | Viscosity-Cstks Initial | Viscosity-Cstks 6 days |
|---|---|---|---|---|---|---|---|---|---|
| 2 | glyceryl poly(oxyethyleneoxy-1,2-propylene)ether, viscosity 135 cstks at 100° F. | 0.0<br>65<br>65<br>65 | 0.0<br>35<br>35<br>35 | none<br>mixed m,p-cresols<br>p-cresol<br>pyrogallol | 0.0<br>0.5<br>0.5<br>0.5 | | 51.0<br>0.0<br><1.0<br><1.0 | 32° F.<br>1411<br>1479<br>1536<br>1508 | 2890<br>1467<br>1455<br>1547 |
| 3 | glyceryl poly(oxyethylene,oxy-1,2-propylene)ether, viscosity 200 cstks at 100° F. | 0.0<br>85<br>85 | 0.0<br>15<br>15 | none<br>p-cresol<br>o-phenylphenol | 0.0<br>0.5<br>2.0 | 15.0<br>0.5<br>0.0 | 77.0<br>0.0<br>0.0 | 32° F.<br>2072<br>2118<br>2476 | 1129<br>2308<br>2661 |
| 4 | glyceryl poly(oxyethylene,oxy-1,2-propylene)ether, viscosity 200 cstks at 100° F. | 0.0<br>65<br>65<br>65<br>65<br>65<br>65<br>65<br>65<br>65 | 0.0<br>35<br>35<br>35<br>35<br>35<br>35<br>35<br>35<br>35 | none<br>phenol<br>mixed m,p-cresols<br>pyrogallol<br>2,4 bis(alpha-methyl-benzyl)-phenol<br>beta-naphthol<br>resorcinol<br>p-tertiary-butyl-phenol<br>p-phenylphenol<br>p,p'-isopropylidenediphenol | 0.0<br>2.0<br>0.5<br>0.5<br>0.5<br>0.5<br>2.0<br>2.0<br>2.0<br>2.0 | 15.0<br>0.0<br>0.0<br>+1.0<br><1.0<br>1.0<br>+0.5<br>+0.5<br>1.0<br>+1.0 | 77.0<br>0.0<br>0.0<br>+1.0<br><1.0<br><1.0<br>+0.5<br>+1.0<br>1.5<br>1.0 | 32° F.<br>2072<br>2416<br>2280<br>2256<br>2259<br>2290<br>2685<br>2375<br>2430<br>2572 | 1129<br>2585<br>2300<br>2458<br>2253<br>2321<br>2751<br>2599<br>2481<br>2686 |
| 5 | polypropylene glycol, average mol wt. 750 | 0.0<br>65<br>65 | 0.0<br>35<br>35 | none<br>mixed m,p-cresols<br>beta-naphthol | 0.0<br>0.5<br>0.5 | 19<br>0<br>1 | 72<br>0<br>1 | 77.5° F.<br>106<br>107<br>108 | 120<br>109<br>110 |
| 6 | polypropylene glycol, average mol wt. 2000 | 0.0<br>65<br>65 | 0.0<br>35<br>35 | none<br>mixed m,p-cresols<br>beta-naphthol | 0.0<br>0.5<br>0.5 | 25<br>1<br>1 | 75<br>1<br>1 | 32° F.<br>2133<br>2169<br>2209 | 1212<br>2278<br>2293 |
| 7 | polyethylene glycol, average mol wt. 600 | 0.0<br>65<br>65 | 0.0<br>35<br>35 | none<br>mixed m,p-cresols<br>beta-naphthol | 0.0<br>0.5<br>0.5 | 3<br>0<br>0 | 13<br>0<br>0 | 77.5° F.<br>132<br>130<br>132 | 186<br>133<br>133 |

DVB = divinylbenzene
EVB = ethylvinylbenzene

We claim:

1. As a new composition of matter, a polyglycol compound of the class consisting of polyglycols, polyoxyalkylene ethers of aliphatic alcohols, and 7. A polyglycol corresponding to the general formula $H(OC_nH_{2n})_mOH$ wherein $n$ is a small integer and $m$ is an integer at least 2, stabilized against decomposition by a small proportion of a condensation product of a nuclearly hydroxylated aromatic hydrocarbon with a di-alpha-alkenyl aromatic hydrocarbon wherein each alkenyl group is attached to the aromatic nucleus.

8. A polyglycol corresponding to the general formula $H(OC_nH_{2n})_mOH$ wherein $n$ is one of the integers 2 and 3 and $m$ is an integer at least 2, and having a molecular weight of at least 300, stabilized against decomposition by an effective proportion from 0.1 to 5 per cent by weight of a resinous condensation product of a nuclearly hydroxylated aromatic hydrocarbon with divinylbenzene.

9. A polypropylene glycol having a molecular weight of at least 300, stabilized against decomposition by an effective proportion from 0.1 to 5 per cent by weight of a resinous condensation product of a nuclearly hydroxylated aromatic hydrocarbon with divinylbenzene.

10. A polypropylene glycol with a molecular weight of approximately 2000 stabilized against decomposition with 0.1 to 5 per cent by weight of a resinous condensation product of beta-naphthol and an equimolar weight of a mixture of about 65 weight per cent divinylbenzene and about 35 weight per cent ethylvinylbenzene.

11. A polyethylene glycol having a molecular weight of at least 300, stabilized against decomposition by an effective proportion from 0.1 to 5 per cent by weight of a resinous condensation product of a nuclearly hydroxylated aromatic hydrocarbon with divinylbenzene.

12. A polyethylene glycol with a molecular weight of approximately 600 stabilized against decomposition with 0.1 to 5 per cent by weight of a resinous condensation product of a mixture of meta and para cresols and an equimolar weight of a mixture of about 65 weight per cent divinylbenzene and about 35 weight per cent ethylvinylbenzene.

13. A polyoxyalkylene ether prepared by the condensation of at least one alkylene oxide with an aliphatic alcohol and having a molecular weight of at least 300 stabilized against decomposition by a small proportion of a condensation product of a nuclearly hydroxylated aromatic hydrocarbon with a di-alpha-alkenyl aromatic hydrocarbon wherein each alkenyl group is attached to the aromatic nucleus.

14. A glyceryl poly(oxyethylene, oxy-1,2-propylene) ether prepared by the condensation of a mixture of ethylene oxide and propylene oxide with glycerol stabilized against decomposition by an effective proportion from 0.1 to 5 per cent by weight of a resinous condensation product of a nuclearly hydroxylated aromatic hydrocarbon with divinylbenzene.

15. A glyceryl poly(oxyethylene, oxy-1,2-propylene) ether prepared by the reaction of an equimolar mixture of ethylene and propylene oxides with glycerol and having a viscosity of 135 centistokes at 100° F. stabilized against decomposition with 0.1 to 5 per cent by weight of a resinous condensation product of pyrogallol and an equimolar weight of a mixture of about 65 weight per cent divinylbenzene and about 35 weight per cent ethylvinylbenzene.

16. A glyceryl poly(oxyethylene, oxy-1,2-propylene) ether prepared by the reaction of an equimolar mixture of ethylene and propylene oxides with glycerol and having a viscosity of 200 centistokes at 100° F. stabilized against decomposition with 0.1 to 5 per cent by weight of a resinous condensation product of phenol and an equimolar weight of a mixture of about 65 weight per cent divinylbenzene and about 35 weight per cent ethylvinylbenzene.

17. A glyceryl poly(oxyethylene, oxy-1,2-propylene) ether prepared by the reaction of an equimolar mixture of ethylene and propylene oxides with glycerol and having a viscosity of 200 centistokes at 100° F. stabilized against decomposition with 0.1 to 5 per cent by weight of a resinous condensation product of a mixture of meta and para cresols and an equimolar weight of a mixture of about 65 weight per cent divinylbenzene and about 35 weight per cent ethylvinylbenzene.

18. In a process wherein a polyglycol compound of the class consisting of polyglycols, polyoxyalkylene ethers of aliphatic alcohols, and the aliphatic acid esters of those of these compounds having free hydroxyl groups is subjected to elevated temperatures of at least 200° F. for an extended period, the method of minimizing decomposition thereof which comprises maintaining dissolved therein a small but effective proportion of a condensation product of a nuclearly hydroxylated aromatic hydrocarbon with a di-alpha-alkenyl aromatic hydrocarbon wherein each alkenyl group is attached to the aromatic nucleus.

EDWARD O. OHLMANN.
WILLIAM S. THURBER.

References Cited in the file of this patent

UNITED STATES PATENTS

| Number | Name | Date |
|---|---|---|
| 2,107,069 | Evans | Feb. 1, 1938 |
| 2,133,297 | Jones | Oct. 18, 1938 |
| 2,224,837 | Rosenthal et al. | Dec. 10, 1940 |
| 2,315,556 | Soday | Apr. 6, 1943 |
| 2,506,410 | Blake | May 2, 1950 |
| 2,510,540 | Ballard et al. | June 6, 1950 |
| 2,514,982 | Walters et al. | July 11, 1950 |

FOREIGN PATENTS

| Number | Country | Date |
|---|---|---|
| 425,728 | Great Britain | Mar. 20, 1935 |